United States Patent
Enomoto et al.

(10) Patent No.: US 10,566,876 B2
(45) Date of Patent: Feb. 18, 2020

(54) AXIAL GAP ROTARY ELECTRIC MACHINE

(71) Applicant: Hitachi, Ltd., Chiyoda-ku, Tokyo (JP)

(72) Inventors: Yuji Enomoto, Tokyo (JP); Hirooki Tokoi, Tokyo (JP); Naoki Sakurai, Tokyo (JP); Hisashi Tanie, Tokyo (JP); Kenta Deguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 56 days.

(21) Appl. No.: 16/078,298

(22) PCT Filed: Feb. 25, 2016

(86) PCT No.: PCT/JP2016/055676
§ 371 (c)(1),
(2) Date: Aug. 21, 2018

(87) PCT Pub. No.: WO2017/145333
PCT Pub. Date: Aug. 31, 2017

(65) Prior Publication Data
US 2019/0058374 A1 Feb. 21, 2019

(51) Int. Cl.
*H02K 9/20* (2006.01)
*H02K 7/14* (2006.01)
(Continued)

(52) U.S. Cl.
CPC .............. *H02K 9/20* (2013.01); *F04D 3/00* (2013.01); *F04D 13/0606* (2013.01);
(Continued)

(58) Field of Classification Search
CPC .... F04D 13/0606; F04D 3/00; F04D 13/0666; F04D 29/5806; F28D 15/02;
(Continued)

(56) References Cited

U.S. PATENT DOCUMENTS

| 6,211,587 B1 * | 4/2001 | Enomoto ............... H02K 1/185 310/216.057 |
| 2003/0042806 A1 * | 3/2003 | Inaba ....................... H02K 5/18 310/58 |

(Continued)

FOREIGN PATENT DOCUMENTS

| JP | 2006-94664 A | 4/2006 |
| JP | 2008-92735 A | 4/2008 |

(Continued)

OTHER PUBLICATIONS

International Search Report (PCT/ISA/210) issued in PCT Application No. PCT/JP2016/055676 dated May 24, 2016 with English translation (two (2) pages).

(Continued)

*Primary Examiner* — Alex W Mok
(74) *Attorney, Agent, or Firm* — Crowell & Moring LLP

(57) ABSTRACT

To significantly improve a heat dissipation property of an axial gap rotary electric machine within a size necessary for configuring a motor. In an axial gap rotary electric machine comprising a stator and a rotor in an axial direction, the stator has a plurality of stator cores arranged in a circumferential direction and coils wound around the stator cores, and a heat pipe obtained by filling an inside of a metal hollow pipe with a refrigerant is arranged in a gap between adjacent coils formed in an outer diameter portion of the stator in a radial direction and a housing with a necessary insulation distance between the coils and the heat pipe. The heat pipe extends in a direction of a rotation axis and an opposite output side, and is in contact with a heat dissipating fin outside an end bracket on the opposite output side.

15 Claims, 14 Drawing Sheets

(51) Int. Cl.
*H02K 11/33* (2016.01)
*H02K 11/40* (2016.01)
*H02K 16/02* (2006.01)
*H02K 21/24* (2006.01)
*F28D 15/02* (2006.01)
*F04D 3/00* (2006.01)
*F04D 13/06* (2006.01)
*H02K 9/04* (2006.01)
*H02K 9/14* (2006.01)
*H02K 5/18* (2006.01)
*H02K 1/14* (2006.01)
*F28D 15/04* (2006.01)
*F04D 29/58* (2006.01)
*F28D 21/00* (2006.01)

(52) U.S. Cl.
CPC ..... *F04D 13/0666* (2013.01); *F04D 29/5806* (2013.01); *F28D 15/02* (2013.01); *F28D 15/0233* (2013.01); *F28D 15/04* (2013.01); *H02K 1/146* (2013.01); *H02K 5/18* (2013.01); *H02K 9/04* (2013.01); *H02K 9/14* (2013.01); *H02K 11/33* (2016.01); *H02K 11/40* (2016.01); *H02K 16/02* (2013.01); *H02K 21/24* (2013.01); *F28D 2021/004* (2013.01); *F28D 2021/0028* (2013.01); *H02K 7/14* (2013.01); *H02K 2211/03* (2013.01)

(58) Field of Classification Search
CPC ........... F28D 15/0233; F28D 15/04; F28D 2021/0028; F28D 2021/004; H02K 11/33; H02K 11/40; H02K 16/02; H02K 21/24; H02K 2211/03; H02K 7/14; H02K 9/20; H02K 1/146; H02K 5/18; H02K 9/04; H02K 9/14; H02K 9/22
USPC ........................................... 310/54
See application file for complete search history.

(56) References Cited

U.S. PATENT DOCUMENTS

| | | | |
|---|---|---|---|
| 2008/0039331 A1* | 2/2008 | Okazaki | H02K 55/04 |
| | | | 505/166 |
| 2008/0067882 A1* | 3/2008 | Murata | H02K 9/19 |
| | | | 310/54 |
| 2013/0187484 A1 | 7/2013 | Liu et al. | |
| 2013/0328429 A1 | 12/2013 | Enomoto et al. | |
| 2014/0009009 A1 | 1/2014 | Deguchi et al. | |

FOREIGN PATENT DOCUMENTS

| | | |
|---|---|---|
| JP | 2009-190578 A | 8/2009 |
| JP | 2012-157157 A | 8/2012 |
| JP | 2014-17915 A | 1/2014 |

OTHER PUBLICATIONS

Japanese-language Written Opinion (PCT/ISA/237) issued in PCT Application No. PCT/JP2016/055676 dated May 24, 2016 (three (3) pages).

* cited by examiner

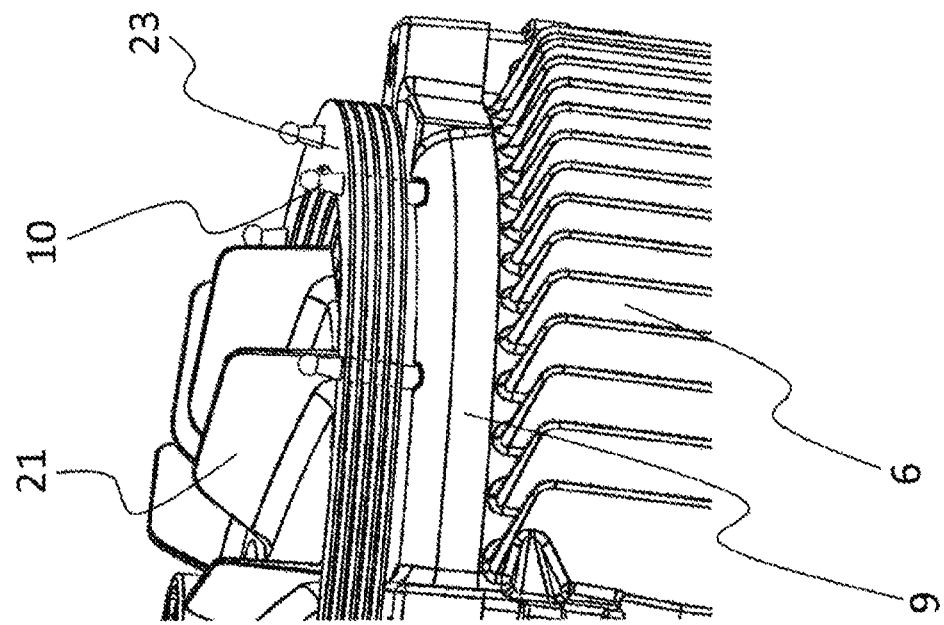
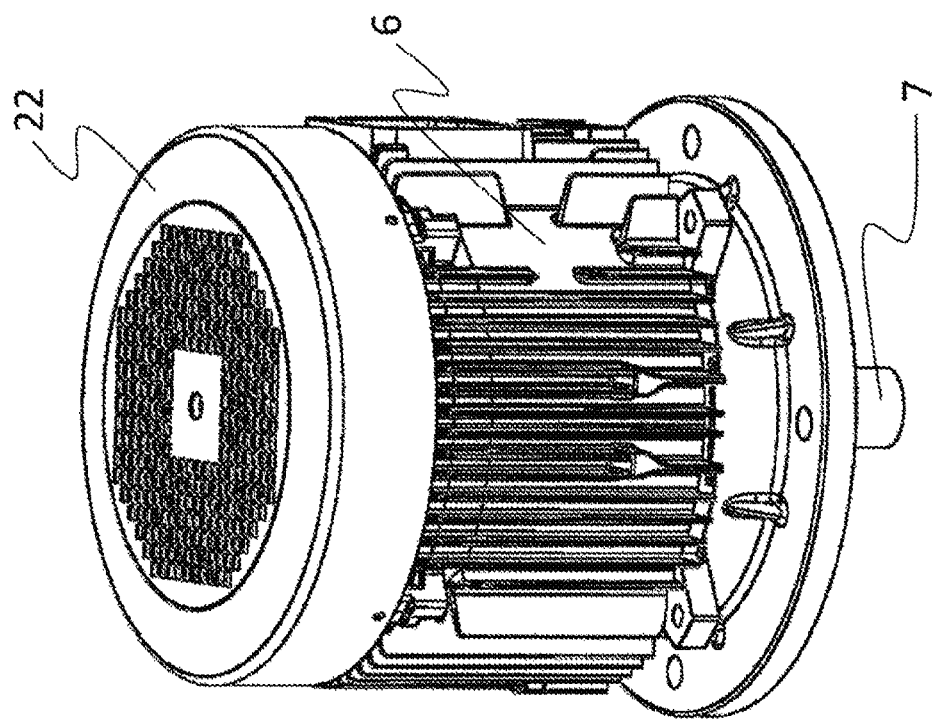

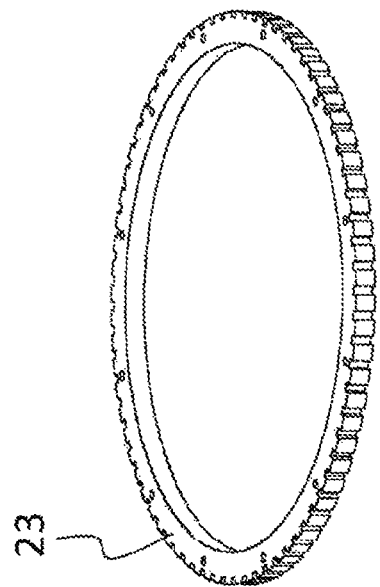
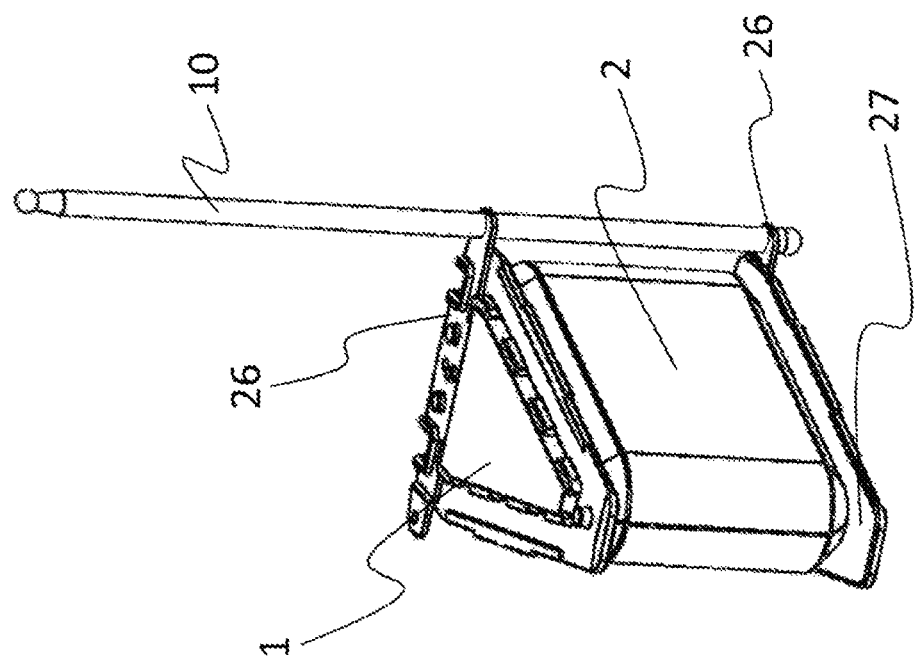
FIG. 6D
FIG. 7A

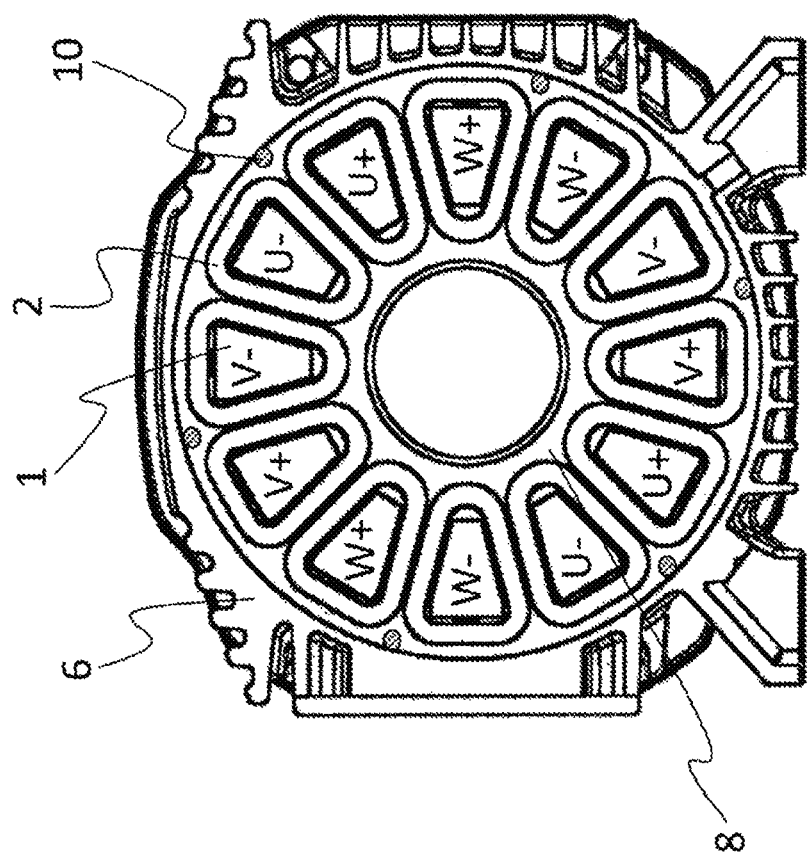
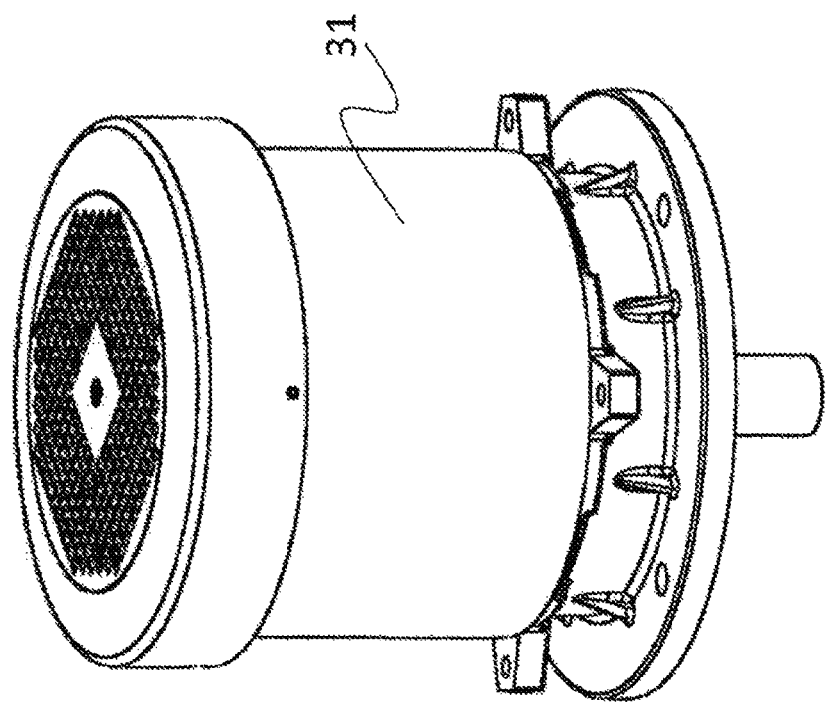

AXIAL GAP ROTARY ELECTRIC MACHINE

TECHNICAL FIELD

The present invention relates to an axial gap rotary electric machine such as an axial gap motor.

BACKGROUND ART

An axial gap rotary electric machine is used for various applications for its characteristics such as thinning of a motor section, high inertia, and high efficiency, as a rotary electric machine used as a power source of an industrial machine. The axial gap rotary electric machine has a structure provided with a disc-shaped rotor having a relatively large diameter as compared with a general radial rotary electric machine. Thus, when a motor is configured in a determined diameter, the axial gap rotary electric machine has a characteristic that a larger torque can be obtained as compared with a radial motor since it is possible to make the diameter of the disc large. When a larger torque is expected, it is possible to configure an axial gap rotary electric machine having a structure provided with two rotors in an axial direction with respect to one stator. In such a system, many permanent magnets, which are magnetic field sources, can be arranged on the disc, and thus, it is possible to increase the amount of magnetic flux contributing to torque generation.

A method for obtaining high efficiency of an axial gap motor that includes one stator and two rotors is proposed in PTL 1. It is possible to suppress a loss to be generated by using an iron core, formed of an amorphous metal foil strip having a low loss, for an iron core section of the stator and using a material having a low loss such as an eddy current loss for a rotor magnet, and thus, it is possible to enhance the efficiency of the motor.

Meanwhile, it is also necessary to improve a heat dissipation property in order to obtain the high efficiency of the motor. A design of a heat dissipation path of heat generated in a stator of an axial gap motor that includes two rotors are studied in PTL 2 and PTL 3. In PTL 2, a conductive and high-thermal-conductivity member is provided between a stator core and a housing to provide a thermal heat dissipating channel to thermally conduct Joule heat generated by the stator to the housing. In addition, a system in which a fin spreading in a radial direction is arranged between adjacent cores, and a pipe thorough which a refrigerant flows is coupled to an end of the fin in an outer radial direction to cool the stator is studied in Patent Literature 3.

CITATION LIST

Patent Literature

PTL 1: JP 2012-157157 A
PTL 2: JP 2014-17915 A
PTL 3: JP 2008-92735 A

SUMMARY OF INVENTION

Technical Problem

The axial gap rotary electric machine disclosed in PTL 1 or the like is characterized by including two disc-shaped rotor magnets each of which has a large diameter to increase a torque output. Meanwhile, the axial gap rotary electric machine has a structure in which the stator is arranged at a center portion in the axial direction, and the stator core and the coil are arranged independently for each pole. Thus, it is necessary to fix and hold the stator core and the coil so as to withstand a torque reaction force of the motor. Further, since the rotors are arranged on both sides in the axial direction with a narrow gap interposed therebetween, the axial gap rotary electric machine has a structure in which a radial (outer or inner) part of the center portion in the axial direction is fixed. In addition, a member for such fixing needs to be a non-conductive and non-magnetic member, and thus, a structure obtained by molding with a resin material is generally adopted.

In the mold structure in which the stator core and the coil are molded by resin, the heat dissipation property of the motor significantly deteriorates because the thermal conductivity of the resin is extremely low. The thermal conductivity of the resin material is about 1 W/m·K at most, and is lower than 230 W/m·K of aluminum, 400 W/m·K of copper, or 70 W/m·K of iron, which are metal materials. Thus, the heat generation amount is restricted due to the heat dissipation performance when an allowable temperature of the motor has been set, and it is difficult to increase the motor capacity per size.

Thus, it is studied to improve the heat dissipation property by utilizing a small cross-sectional area limited to two surfaces in the axial direction by arranging the high-thermal-conductivity member as the thermal heat dissipating channel in the stator in PTL 2. However, this method still has problems that it is difficult to increases a space for arranging the high-thermal-conductive member, and the size of the motor increases in the axial direction if the space is increased.

In addition, when the conductive member is arranged as a heat dissipation member (fin) on a side surface portion of the coil as in PTL 3, it is necessary to provide an insulation distance, and thus, the volume of the coil arranged in an effective cross-sectional area decreases, so that there is a risk that the efficiency of the motor may be impaired. In addition, an eddy current loss due to a coil current and a magnetic flux of the magnet may be generated in a portion of the heat dissipating member, so that there is also a risk that the efficiency may be further reduced.

An object of the present invention is to significantly improve a heat dissipation property of an axial gap rotary electric machine within a size necessary for configuring a motor.

Solution to Problem

In order to solve the above-described problem, the configurations to be described in the claims are adopted.

The present invention includes a plurality of means for solving the above-described problems. An example of an axial gap rotary electric machine of the present invention is an axial gap rotary electric machine including a stator and a rotor in an axial direction, in which the stator has a plurality of stator cores arranged in a circumferential direction and coils wound around the stator cores, and a heat pipe obtained by filling an inside of a metal hollow pipe with a refrigerant is arranged in a gap between adjacent coils formed in an outer diameter portion of the stator in a radial direction and a housing with a necessary insulation distance between the coils and the heat pipe.

In the axial gap rotary electric machine of the present invention, the heat pipe preferably extends in a direction of a rotation axis and an opposite output side and is in contact with and fixed to a bracket on the opposite output side or is in contact with a heat dissipating fin outside an end bracket on the opposite output side.

Advantageous Effects of Invention

According to the present invention, it is possible to expect significant improvement in a heat dissipation property within the size necessary for configuring the motor. It is possible to improve the heat dissipation property of the axial gap rotary electric machine within the same housing frame as that of the conventional motor even without changing a dimension of the stator core and a dimension of the rotor. In addition, it is possible to increase heat transport within the same size, and thus, it is possible to increase the motor output while maintaining the same size.

Further, conventionally, a high heat dissipation material such as aluminum has been used as a material of the housing in order for heat dissipation, and a complex shape has been formed in order to increase a surface area of the heat dissipating fin. However, it is unnecessary to provide the housing for heat dissipation, and it is possible to use a molded resin as a casing.

Other objects, configurations, and effects which have not been described above become apparent from embodiments to be described hereinafter.

BRIEF DESCRIPTION OF DRAWINGS

FIG. 4B is a partially enlarged view of the condensation-side structure illustrated in FIG. 4A.

FIG. 5A is an external perspective view illustrating a condensation side of an industrial motor in which the cooling heat pipe according to the first embodiment of the present invention is arranged.

FIG. 6D is a perspective view for describing another structure of the metallic fin which is used in the condensation portion of the present invention.

FIG. 7A is a perspective view illustrating a structure for holding the cooling heat pipe of the present invention.

FIG. 8B is a cross-sectional view illustrating another heat pipe arrangement example of the second embodiment of the present invention.

FIG. 9A is a perspective view illustrating an axial gap rotary electric machine in which a housing has a resin-molded structure according to a third embodiment of the present invention.

DESCRIPTION OF EMBODIMENTS

Hereinafter, embodiments of the present invention will be described with reference to the drawings and the like. The following descriptions are given to illustrate specific examples of the content of the present invention, and the present invention is not limited to these descriptions, and various alterations and modifications can be made by those skilled in the art within the scope of the technical idea to be disclosed in the present specification. In addition, those having the same function will be denoted by the same reference sign in all the drawings for describing the present invention, and the repetitive descriptions thereof will be omitted in some cases.

First Embodiment

Figure 1A:
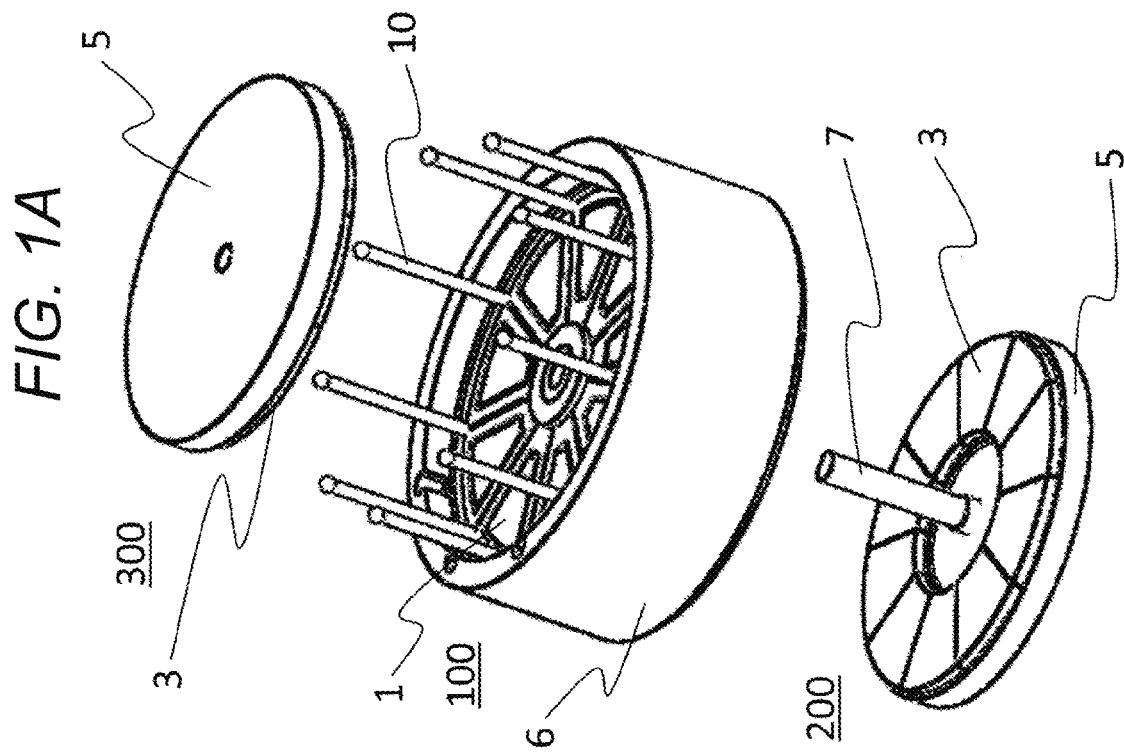
FIG. 1A is a perspective view illustrating a positional relationship among a stator and a rotor of a two-rotor-type axial gap rotary electric machine according to a first embodiment of the present invention and a cooling heat pipe.
Figure 1B:
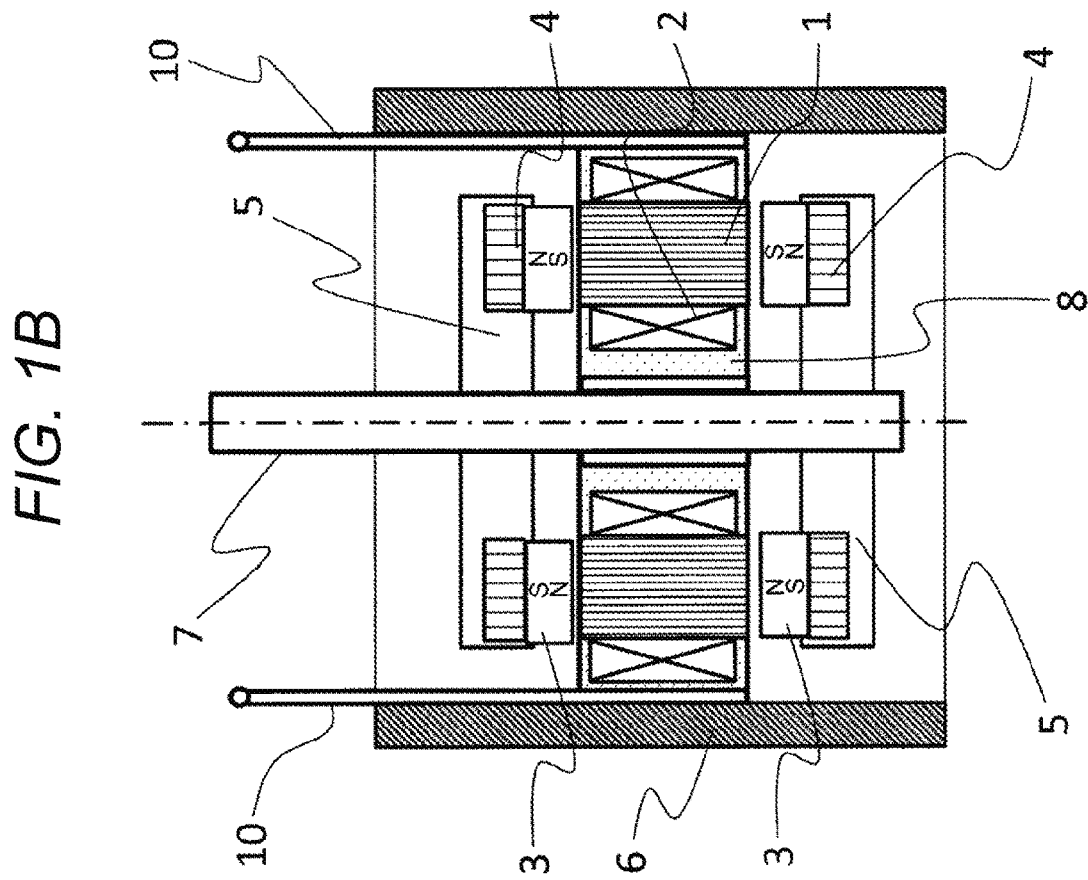
FIG. 1B is a transverse cross-sectional view of the two-rotor-type axial gap rotary electric machine according to the first embodiment of the present invention.

FIGS. 1A and 1B are a perspective view and a cross-sectional view illustrating a positional relationship among a stator and a rotor of an axial gap rotary electric machine according to a first embodiment of the present invention, and a cooling metal pipe.

A cooling metal pipe 10 (hereinafter referred to as a heat pipe) illustrated in FIG. 1A is configured by filling the inside of a metal pipe having a favorable heat conduction property with a refrigerant such as water and sealing both ends of the pipe by welding or the like such that the refrigerant does not come out. An inner portion of the pipe is configured of a thin fine wire, which is called a wick, metal folds, and the like, and has a structure that makes it easy for heat of a metal pipe surface to transmit to the inside. In addition, the wick also has an effect of making it easier for the refrigerant to move to a place where the refrigerant density is low by utilizing the capillary phenomenon when the refrigerant is liquid. Regarding the heat pipe configured in this manner, a thin one about 3 mm in diameter has been put into practical use, and the heat pipe is used for heat transport of a heat source in which a heat generation density is locally large such as a semiconductor package such as a CPU of a personal computer.

As illustrated in FIG. 1A, the axial gap rotary electric machine is configured of one stator 100 and two rotors 200 and 300. The rotor 200 illustrated on the lower side of the paper plane is a rotor having a permanent magnet 3 in a circumferential direction. The permanent magnet rotor has a structure in which magnetic poles paired with an N-pole and an S-pole are periodically aligned in a rotation direction. In FIG. 1A, a ring-shaped disc-like magnet has a structure in which ten magnetic poles are aligned in the circumferential direction. One magnetic pole has a fan shape, and a structure in which the magnetic poles are aligned on a circumference at an equal angular pitch. Regarding the magnetic poles, the same rotor structure can be obtained by pasting one magnet or a plurality of divided magnets per one pole. As illustrated in the cross-sectional view of FIG. 1B, a yoke portion 4 is generally provided between the permanent magnet 3 and a structural body rotor yoke 5 in the permanent magnet rotors 200 and 300. The yoke portion 4 is made of a soft magnetic material in order to cause a magnetic flux from the permanent magnet 3 to pass therethrough. Since the magnetic flux of the permanent magnet 3 is a direct current component, and influence of an eddy current loss is small, there is also a case where a magnetic body on the back side of the magnet is made of carbon steel (S45C), magnetic stainless steel, or the like. In the case of aiming to enhance the efficiency of the motor, the yoke portion 4 is configured to have a structure in which an eddy current is hardly generated by stacking thin electromagnetic steel plates or the like in order to suppress the eddy current loss generated by influence of a rotating magnetic field and an alternating magnetic field formed on the stator side. In the drawing, a reference sign 7 represents a rotating shaft of the rotor.

As illustrated in FIG. 1A, the stator 100 is configured to have a structure in which a stator core (iron core) 1 having a substantially fan shape is arranged in the circumferential direction and a stator coil 2 is wound around the stator core. The stator 100 needs to be fixed (held) to the housing 6, and thus, nine stator cores 1 and coils 2 are configured to be integrated with a housing 6 using a stator-molded resin portion 8 as illustrated in FIG. 1B in the illustrated case where the stator cores are arranged in the circumferential direction. As a result, the stator core 1 and the stator coil 2 are fixed to the housing 6, and thus, can receive a reaction force when the rotor outputs a torque and operate as a motor. In such a stator, it is difficult to dissipate heat generated in the stator coil 2 and the stator core 1 to the outside. This is because, in general, the thermal conductivity of metal is high, for example, 70 W/m·K in the case of iron, 230 W/m·K in the case of aluminum, and 400 W/m·K in the case of copper, while the thermal conductivity is merely about 1 W/m·K at most in the case of resin. In general, the heat generated in the motor (the stator coil and the stator core) is transmitted to the housing 6 having a favorable heat conduction property and is dissipated from a surface of the housing. In the case of an axial gap motor having two rotors, however, a heat transfer path necessarily contains resin so that there is a problem that the heat is likely to be trapped inside the stator. Thus, in the first embodiment, in the configuration, a necessary insulation distance is provided in a gap between the adjacent coils in a radially outermost diameter portion of the stator to arrange the metal pipe (heat pipe) filled with the refrigerant such as water, one end of the heat pipe is arranged in a stator axial portion of the axial gap motor, and the other end thereof is arranged to extend in the axial direction as illustrated in FIG. 1A or 1B. As a result, the refrigerant filling the inside of the heat pipe is warmed by the Joule heat generated by a current of the stator coil of the motor at a portion close to the stator of the motor, the refrigerant evaporates and the vapor thereof rises through the inside of the pipe and dissipates heat at a portion where the vapor contacts air at the other end. Then, the heat transport between the motor stator section and the external air is efficiently performed due to a physical phenomenon in which the vapor is condensed and the refrigerant returns to a liquid. Regarding the thermal conductivity of the heat pipe, it is possible to realize a thermal conductivity 50 to 100 times as high as that of metal such as copper. Thus, even a heat pipe having a small cross-sectional area, which can be arranged in the gap between the coil and the coil, can transport a large amount of heat. Since the fixing of the heat pipe can be obtained by integration using resin at the time of integrally molding the stator and the housing, it is unnecessary to provide an additional new part other than the heat pipe.

Figure 2A:
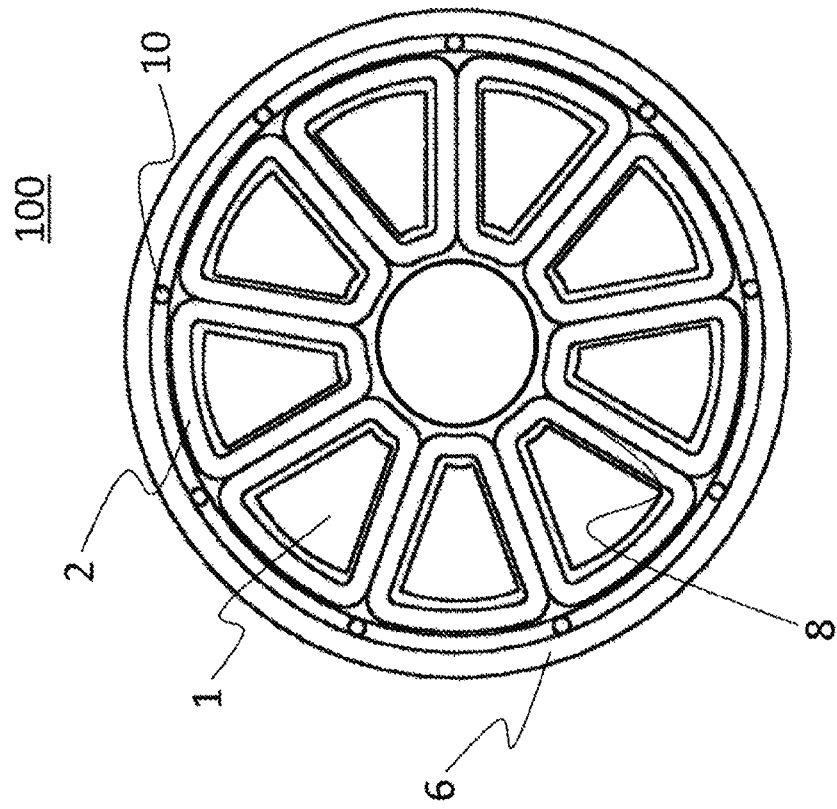
FIG. 2A is an axial cross-sectional view illustrating a positional relationship between the stator and the cooling heat pipe of the axial gap rotary electric machine according to the first embodiment of the present invention illustrated in FIG. 1.
Figure 2B:
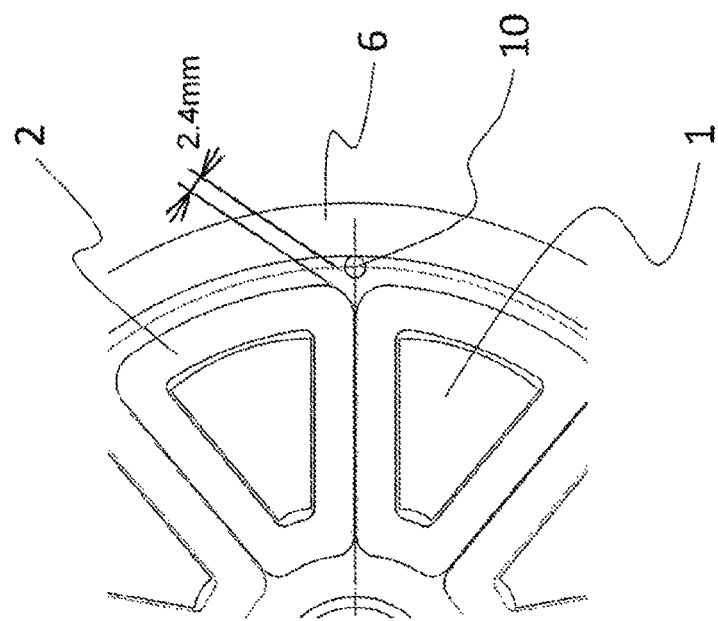
FIG. 2B is a partially enlarged view of the stator of the axial gap rotary electric machine illustrated in FIG. 2A.

FIGS. 2A and 2B are drawings for describing an arrangement of the heat pipe described in FIGS. 1A and 1B with an axial cross section. As illustrated in FIG. 2A, the coil 2 of the stator 100 has the shape of being wound around the stator core 1 and has a substantially fan shape. A corner portion of a winding has an R-shape, and a gap for arranging the thin heat pipe 10 is formed between the adjacent coil and coil. FIG. 2B illustrates a shape of a detail part of the gap. A spatial distance required depending on the voltage specification has been defined between the coil 2 and the housing 6 illustrated in FIG. 2B, and it is necessary to arrange the coils while keeping s distance. The illustrated motor represents an example of an industrial motor driven with a voltage of about 200 V, and the spatial distance from an end portion of the coil formed of enamel coating or the like to a metal body needs to be 2.4 mm or longer. It is necessary to make a distance from a circumferential end portion of the coil to the housing 6 larger than the spatial distance since it is necessary to arrange a connecting line of a terminal or the like, so that it is necessary to provide a large space that needs to be filled with resin. As described above, such a resin portion has an extremely poor thermal conductivity, and thus, there is a problem that a heat dissipation property remarkably deteriorates. Thus, a structure in which the small-diameter heat pipe 10 is arranged in the minute gap formed between the adjacent coils and the housing while securing a spatial distance of 2.4 mm as illustrated in FIG. 2B. This example illustrates a dimensional relationship in which a heat pipe having a diameter of 3 mm can be arranged while maintaining the required spatial distance.

Figure 3A:
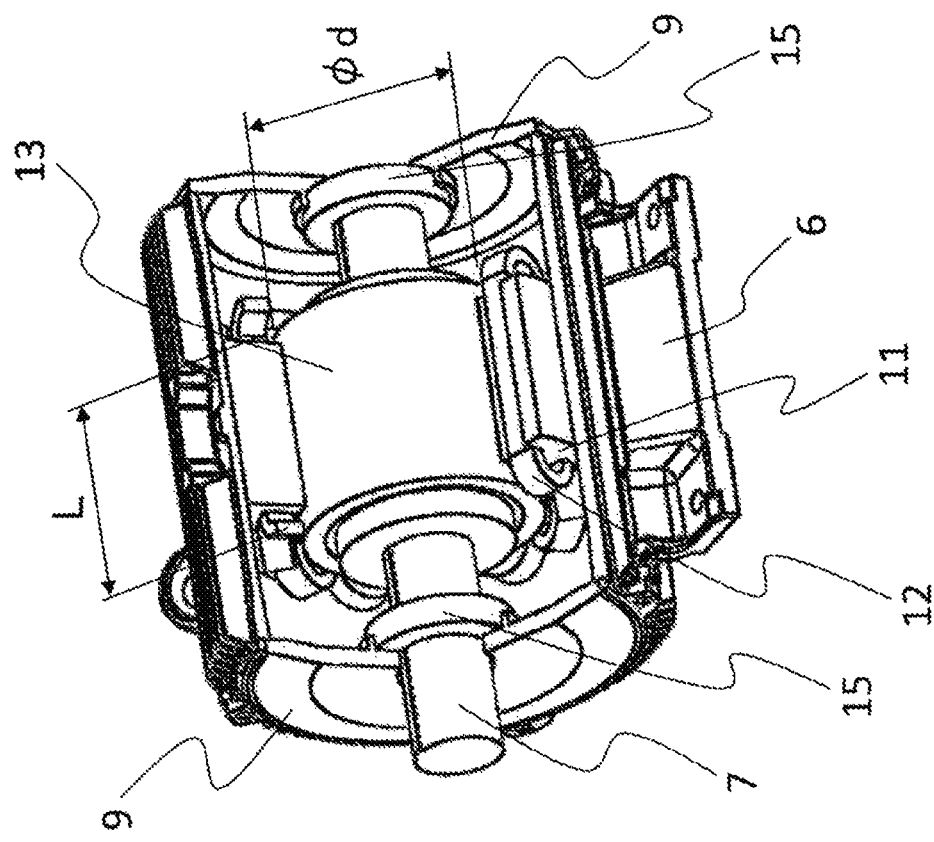
FIG. 3A is a perspective view illustrating a structure of a general radial rotary electric machine.
Figure 3B:
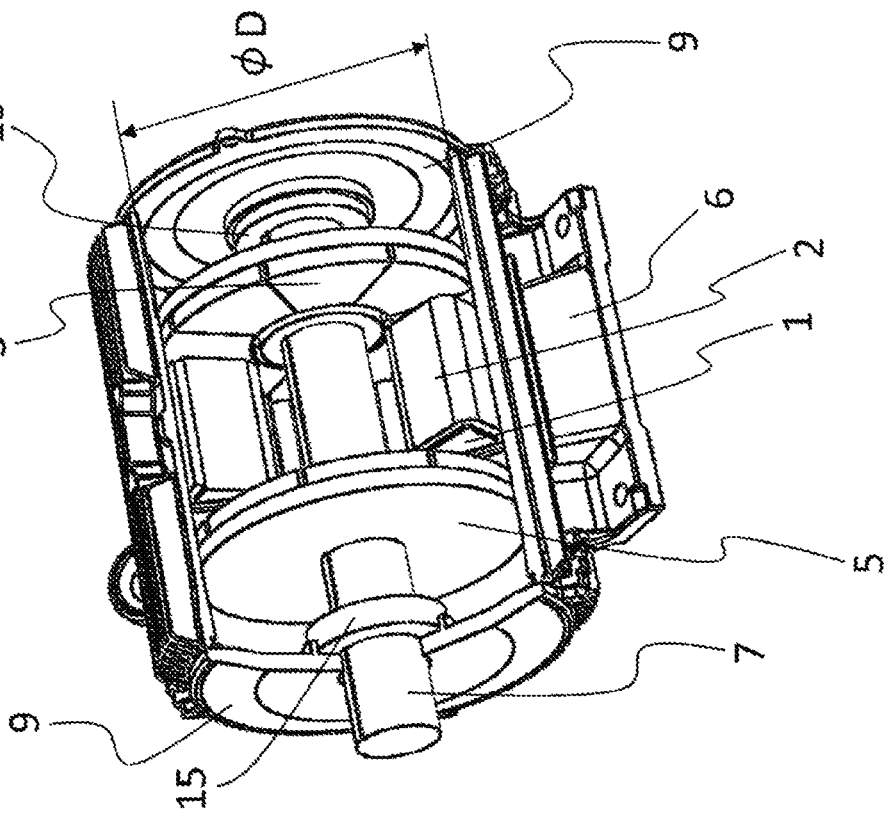
FIG. 3B is a perspective view illustrating a structure of a general axial gap rotary electric machine.

Next, a difference between the axial gap motor and a radial gap motor will be described with reference to FIGS. 3A and 3B. FIGS. 3A and 3B illustrate a structure comparison between a general radial gap rotary electric machine and an axial gap rotary electric machine, respectively, in perspective views. FIG. 3A illustrates the radial gap rotary electric machine, and FIG. 3B illustrates the axial gap rotary electric machine. In this comparative example, both the rotary electric machines are illustrated assuming the case of being mounted on the same housing 6. At this time, in the radial gap rotary electric machine, a stator iron core 11 in which electromagnetic steel plates having grooves for mounting windings (coils) 12 called slots are stacked in the axial direction is formed in an inner diameter portion of the housing 6. Further, a rotor in which a permanent magnet 13 is mounted on a rotating shaft 17 is formed in an inner portion of the stator iron core 11. At this time, the opposing area between the rotor and the stator is defined by a diameter $\phi d$ of the rotor and an axial length L, and a size thereof is $\pi \times \phi d \times L$. Since the diameter of the rotor is inside the stator with respect to the diameter of the housing, $\phi d$ is small. Incidentally, a reference sign 9 denotes an end bracket, and a reference sign 15 denotes a bearing in the drawing.

On the other hand, the axial gap rotary electric machine illustrated in FIG. 3B illustrates a structure having a rotor on which two permanent magnets 3 are mounted. In this structure, the opposing area between the rotor magnet 3 and the stator core 1 is large because it is possible to use a full inner diameter of the housing as a rotor diameter $\phi D$. In this illustrated model, the opposing area is $\pi/4 \times \phi D^2 \times 2$. This value in this model is about three times of that in the radial gap rotary electric machine illustrated above. From this viewpoint, it is understood that the axial gap rotary electric machine has an advantage that it is possible to obtain a larger torque as compared with the radial gap rotary electric machine in the case of being mounted inside the housing having the same diameter.

Here, in the case of the radial rotary electric machine, the stator iron core 11 is generally made of the electromagnetic steel plate (iron), and forms the stator with the copper winding 12. Since this stator iron core is fixed to the housing 6 by shrink-fitting, press-fitting, or the like, the stator iron core has a structure to be coupled with metal having a favorable heat conduction property. Thus, it is understood that the structure in which Joule heat due to a current generated in the stator coil and heat generated due to a core loss of the iron core 11 are easily transmitted to the housing is formed. In the case of the axial gap motor, it is understood that it is possible to increase the opposing area between the magnet and the stator to triple the torque and increase an output, but the amount of heat generation increases as the output increases if a loss ratio relative to the output is the same (efficiency is the same). At this time, in the case of the axial gap motor configured to hold the stator with resin as described above, an increase in a motor output within the same size is meaningless if heat transport of the increased amount of heat generation cannot be performed.

Figure 4A:
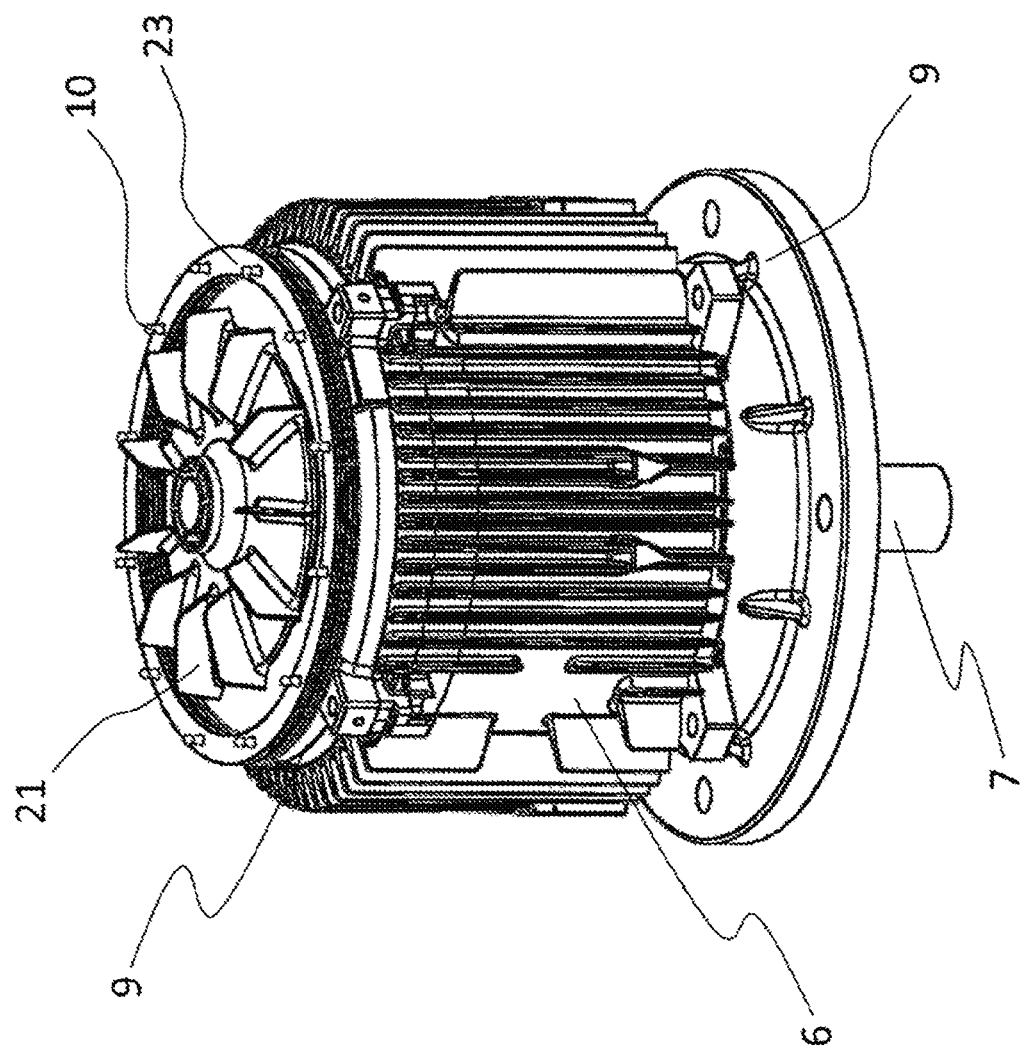
FIG. 4A is a perspective view illustrating a condensation-side structure of the cooling heat pipe of the first embodiment of the present invention.

Thus, in the present invention, the improvement of the heat dissipation property by the above-described heat pipe arrangement is realized in order to improve the output of the axial gap rotary electric machine having two rotors. FIGS. 4A and 4B illustrate a heat dissipating fin air-blowing structure of a heat pipe condensation portion configured to increase a heat dissipation area and a heat dissipation amount in order for improvement of the heat dissipation property. FIG. 4A illustrates a structure of the end bracket on a motor opposite output shaft side where the heat pipe of the present embodiment is arranged in a perspective view. The heat pipe extended from the stator is arranged to pass through a fitting hole of the end bracket 9 that holds the bearing while being in contact therewith and to be further extended. In this structure, a plurality of metal heat dissipating fins 23 each of which has a disc shape, has a favorable heat conduction property, and includes holes opened so as to make contact with the heat pipes 10 are brought into contact with a distal end portion of the extended heat pipe 10. Further, in this structure, the fin 23 is configured such that wind flows in a radial direction by an outer fan 21 attached to an end portion in the axial direction of the motor, and the heat dissipating fins 23 are exposed to a large amount of wind. As a result, the condensation performance of the condensation portion of the heat pipe is significantly improved by the heat transfer to the heat dissipating fin and the heat transport to the air by the wind. FIG. 4B illustrates a detailed structure of the heat dissipating fin. The heat dissipating fin 23 has a structure in which a plurality of thin metallic plates are stacked, and a gap, through which wind is allowed to pass, is provided between the plates. As a result, the wind from the inside can escape to the outer portion, so that it is possible to enhance the heat dissipation property.

Figure 5B:
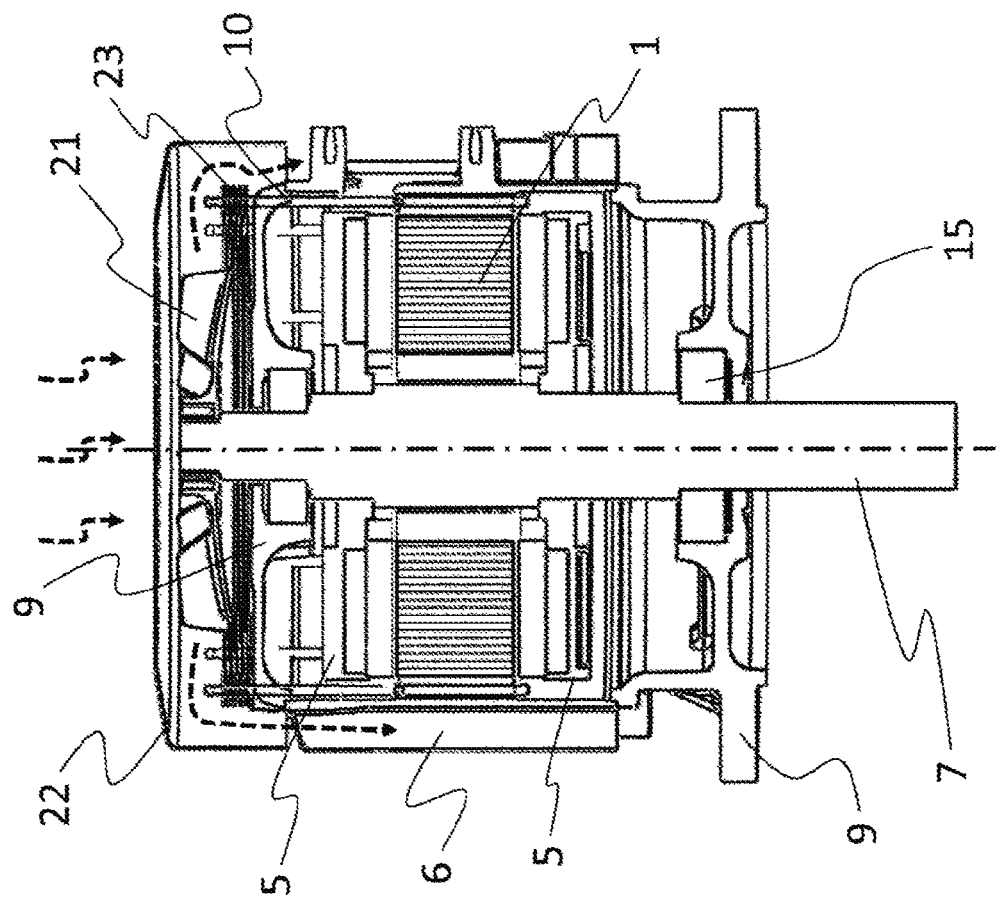
FIG. 5B is a transverse cross-sectional view illustrating structures of an evaporation side and the condensation side of the industrial motor in which the cooling heat pipe according to the first embodiment of the present invention is arranged.

FIGS. 5A and 5B illustrate examples of a structure obtained by practically applying the condenser unit structure illustrated in FIGS. 4A and 4B to a product. In the industrial motor, a cover 22 of the outer fan 21 is attached. An axial end portion of this cover is formed in a mesh shape so that wind can be sucked in the axial direction. As illustrated in FIG. 5A, there is no difference from the current industrial motor in terms of the appearance, and it is possible to adopt the current fan cover without adding components. FIG. 5B illustrates a path of cooling wind. In this structure, a direction of the wind from the axial end portion is changed into the circumferential direction by the radial fan 21, and the wind hits the heat dissipating fin 23 at the end portion of the heat pipe 10 to flow to the housing 6 of the motor.

Figure 6A:
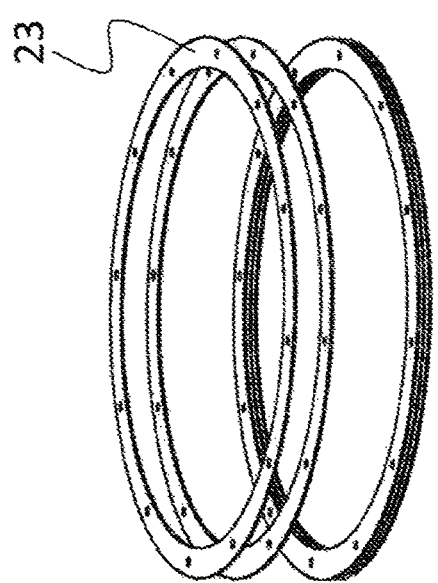
FIG. 6A is a perspective view for describing a structure of a metallic fin which is used in a condensation portion of the present invention.
Figure 6B:
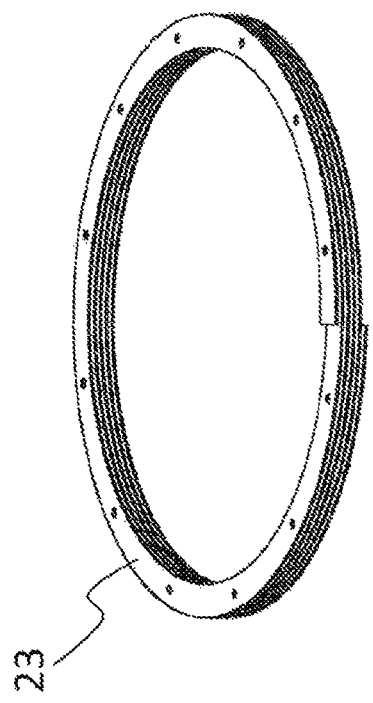
FIG. 6B is a perspective view for describing another structure of the metallic fin which is used in the condensation portion of the present invention.
Figure 6C:
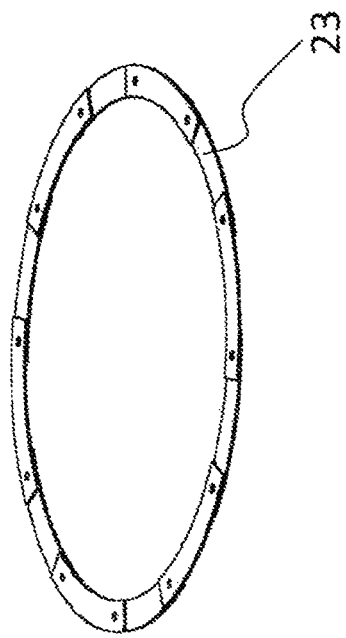
FIG. 6C a perspective view for describing another structure of the metallic fin which is used in the condensation portion of the present invention.

FIGS. 6A to 6D illustrate various modes of the heat dissipating fin. FIG. 6A illustrates a configuration in which a plurality of simple discs are stacked to form the fin 23. In the case of the disc shape illustrated in FIG. 6A, a material utilization rate is poor because the fin is created by press-punching a flat plate. In order to compensate for this drawback, FIG. 6B illustrates a shape obtained by processing only holes in a thin hoop-like member at equal pitches by a press and winding the processed member in an edgewise manner. As a result, the material utilization rate can be remarkably improved. FIG. 6C illustrates a shape in which divided plates are joined together. Also in this shape, the improvement of the material utilization rate can be expected. In addition, since an edgewise bending step is not required, it is possible to manufacture the fin with relatively simple equipment. FIG. 6D illustrates a structure that is configured as a heat sink block instead of a stacked structure. In order to enhance the heat dissipation property, it is desirable to adopt a structure in which irregularities are formed (grooving is performed) on a surface to increase a heat dissipation surface area.

Figure 7B:
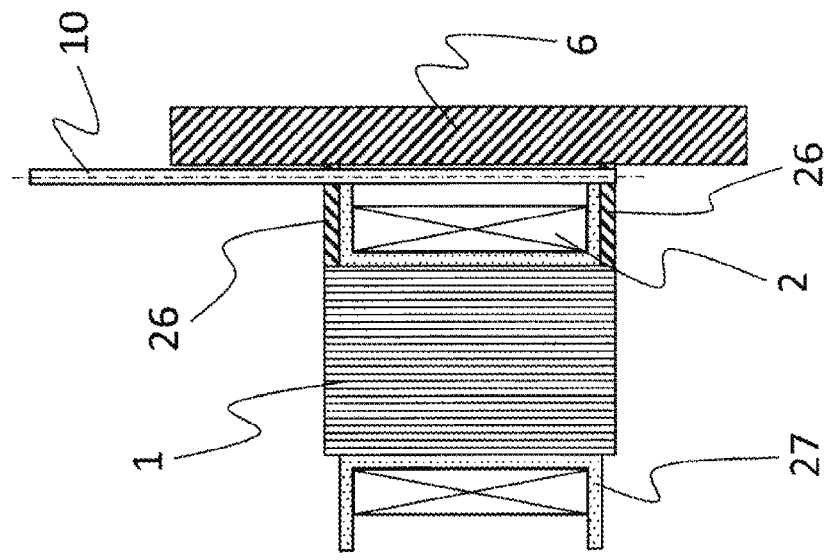
FIG. 7B is a cross-sectional view illustrating the structure for holding the cooling heat pipe of the present invention.

FIGS. 7A and 7B illustrate structure examples relating to a holding structure of the stator core 1 and the coil 2 of the axial gap motor, an insulating bobbin 27, and the heat pipe 10. FIG. 7A illustrates a magnetic pole structure for one pole of the stator. The stator coil 2 is wound around the stator core 1 having a substantially trapezoidal section with a resinous insulating bobbin 27 around the stator core interposed therebetween. A heat dissipating plate 26 is arranged at a portion on the outer diameter side in the circumferential direction of an axial end portion of the resin bobbin 27, the portion being in contact with the housing, so as to contact the stator core 1. A shape of the heat dissipating plate 26 is formed to have a structure in which a hole for coupling with a heat dissipating plate of an adjacent magnetic pole is formed in addition to a hole for positioning with respect to the insulating bobbin 27 of the stator. In this structure, the heat pipe 10 of the present invention is inserted and held in a portion of the coupling hole with respect to the adjacent magnetic pole. The heat dissipating plate 26 also has a function of causing the stator core 1 to electrically contact a casing component such as the housing to be grounded, and it is desirable that the heat dissipating plate 26 of each magnetic pole contact the housing. Since the heat pipe 10 is made of a conductive material, it is possible to expect the electrical contact by being press-fit to the heat dissipating plate 26, and it is possible to configure the grounding since the heat dissipating plate 26 is electrically connected to the end bracket and the heat dissipating fin. FIG. 73 illustrates the above description content in a cross-sectional view. As illustrated in the cross-sectional view in a lateral direction, the stator core 1 is held by the resin bobbin 27, and has a structure in which the stator core 1 protrudes more than the resin bobbin 27 in the upper and lower parts in the axial direction. The heat dissipating plates 26 are arranged at flanges of the resin bobbin 27 at the protruding portions on the outer diameter side so that the entire length of the resin bobbin 27 and the heat dissipating plates 26 is configured to be the same as the axial length of the stator core 1. It is understood that the insulation distance from the stator coil 2 to the heat dissipating plate 26, the housing 6, and the heat pipe 10 can be secured by providing the resin bobbin 27.

Although the axial gap rotary electric machine including the one stator and the two rotors on both sides of the stator in the axial direction has been described in the present embodiment, it is possible to apply this heat dissipation structure to other axial gap rotary electric machines such as an axial gap rotary electric machine including one stator and one rotor in the axial direction.

In the present embodiment, in the axial gap rotary electric machine including the stator and the rotor in the axial direction, the heat pipe obtained by filling the inside of the metal hollow pipe with the refrigerant is arranged in the gap between the adjacent coils formed in the outer diameter portion of the stator in the radial direction and the housing with the necessary insulation distance between the coils and the heat pipe. Further, the structure in which one end of the heat pipe is arranged in the stator, the other end is extended in the rotation axis direction to be in contact with and fixed to the end bracket on the opposite output side or the structure in which the other end is further extended passing through the end bracket to be in contact with the heat dissipating fin is formed. As a result, the refrigerant filling the inside of the heat pipe is warmed by the Joule heat generated by the current of the stator coil at the portion close to the stator, and the refrigerant evaporates and the vapor thereof moves through the inside of the pipe and dissipates heat at the portion in contact with the heat dissipating fin at one end, so that the vapor condenses and returns to the liquid, and the heat transport between the stator section and the heat dissipating fin can be efficiently performed. As a result, it is possible to significantly improve the heat dissipation property of the axial gap rotary electric machine.

Second Embodiment

Figure 8A:
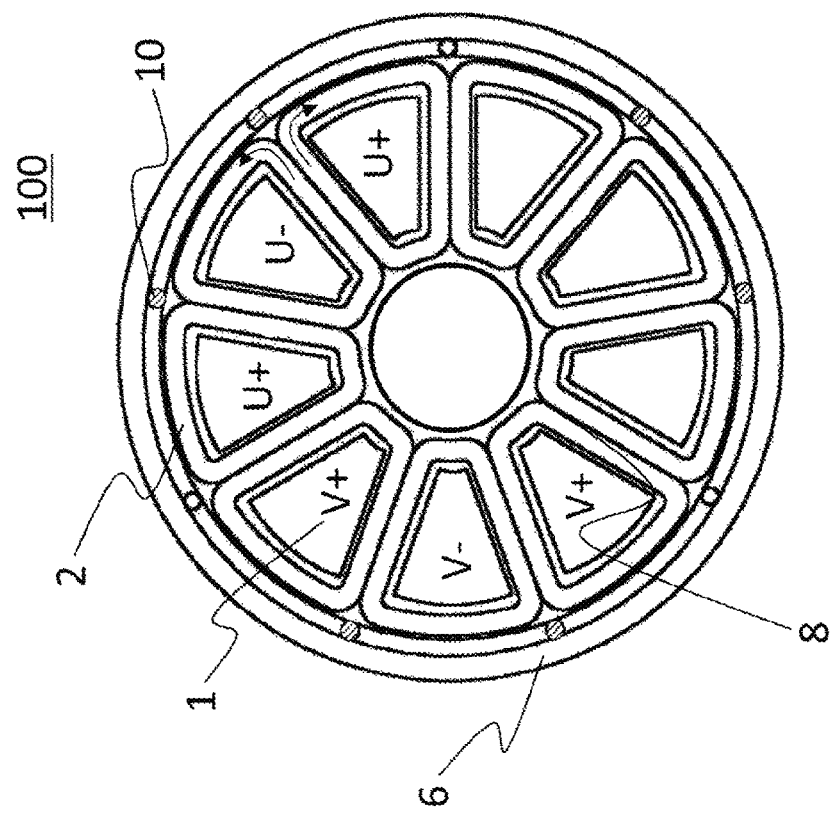
FIG. 8A is a cross-sectional view illustrating a heat pipe arrangement example of a second embodiment of the present invention.

FIGS. 8A and 8B illustrate an axial gap rotary electric machine obtained by improving an arrangement of a heat pipe according to a second embodiment of the present invention. Since the heat pipe is configured using a metal member, an eddy current loss is generated to some extent in the heat pipe due to the influence of a magnetic flux of a stator of a motor. The eddy current loss is more easily generated as the heat pipe is closer to a stator coil. Thus, it is better to make the pipe close to the stator coil in order to easily transfer heat, but it is better to make the heat pipe far from the stator coil in order to reduce the loss, which causes a contradiction. Therefore, as a countermeasure for the contradiction, it is necessary to arrange the heat pipe to a portion where the eddy current loss is less likely to occur. An example of a place where the heat pipe is arranged is illustrated in the drawing.

FIG. 8A illustrates a winding arrangement example of a motor with nine stator magnetic poles. The winding arrangement as illustrated in FIG. 8A is formed in a nine-slot motor with eight or ten magnet poles. A flow state of a motor current at this time is indicated by an arrow. Regarding a motor current of a U phase, the current always flows in a reverse direction between coils of U+ and U−, and thus, a magnetic flux generated by the current is canceled at a center portion between the coils and a change amount of the magnetic flux becomes zero. Thus, it is expected that no eddy current is generated between coils having the same phase and different current directions. Thus, there is no influence of the eddy current if the heat pipe 10 is arranged only in the place having such a relationship as illustrated in the drawing. An example in which heat pipes are mounted only at six places hatched with oblique lines is illustrated in the drawing.

FIG. 8B illustrates the case of twelve slots (twelve stator magnetic poles), which is similar to the above-described case. When the number of rotor magnetic poles is ten or fourteen in the case of the twelve-slot motor, the coil arrangement as illustrated in the drawing is formed. At this time, coils of the respective phases are configured such that current flows in reverse directions in adjacent coils, so that portions where the same-phase magnetic poles form currents flowing in opposite directions appear every second central portion. As the heat pipe 10 is arranged in such a place, it is possible to form the configuration in which only the function of transmitting the heat can be expected by eliminating the influence of the eddy current loss.

According to the present embodiment, the heat pipe is arranged only between coils having the same phase and different current directions, and thus, it is possible to reduce the eddy current loss based on the current flowing through the stator coil in addition to the effect of the first embodiment.

Third Embodiment

Figure 9B:
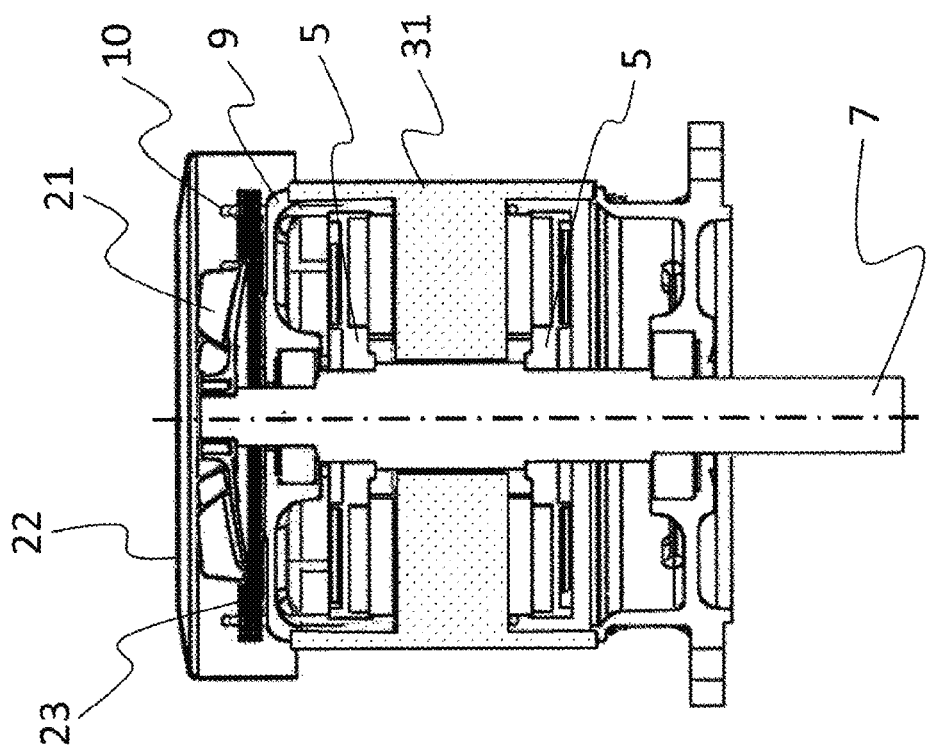
FIG. 9B is a cross-sectional view illustrating the axial gap rotary electric machine according to the third embodiment of the present invention.

FIGS. 9A and 9B illustrate an axial gap motor with a built-in heat pipe according to a third embodiment of the present invention. A configuration in which a non-conductive and non-magnetic material such as a resin material and ceramic is adopted for a housing 31 of a motor illustrated in FIG. 9A is illustrated. The non-metallic material generally has a low thermal conductivity, and the resin material has a thermal conductivity of 1 W/m·K which is merely about $\frac{1}{100}$ of a thermal conductivity of a metal material. Among ceramic material, there is a material having a high thermal conductivity of 150 W/m·K, such as aluminum nitride, but a material such as silicon nitride has a thermal conductivity of 20 W/m·K which is a low value as compared with the metal material. From this viewpoint, it is considered that the heat dissipation inside the motor using these materials is cannot be expected, and thus, a structure in which there is no heat dissipating fin to increase the surface area of the housing surface of the motor is formed. In order to eliminate the heat dissipating fin structure and resolve insufficiency in strength as a neck using these materials, a structure in which rigidity is enhanced by increasing a thick portion or the like is formed. A structure in which the heat pipe is arranged in a gap between stator coils of the motor and heat of the heat pipe is transferred to an axial end portion, which is similar to the structure illustrated in FIGS. 5A and 5B, is formed although there is no heat dissipation from the housing of the motor.

A cross-sectional view is illustrated in FIG. 9B. The housing 31 of the motor is formed using a non-conductive and non-magnetic material and is molded integrally with resin for molding a stator core and a coil. Further, the stator core and the coil are arranged, and the heat pipe 10 extends from a resin-molded axial center portion to the axial end portion. Similarly to the case in FIGS. 5A and 5B, the heat pipe 10 is configured to be brought into contact with the end bracket 9 and the heat dissipating fin 23 and to be hit by wind from the outer fan 21 arranged at the axial end portion. As a result, the heat pipe 10 includes an evaporation portion which becomes high in temperature and a solidification portion which is hit by the wind and becomes low in temperature, thereby enabling the heat transfer. In addition, in the configuration, the heat generation itself also significantly decreases since an eddy current loss due to a magnetic flux generated by the coil of the motor does not occur at all in the non-magnetic and non-conductive housing 31 of the motor. Thus, the amount of heat transferred and dissipated corresponds to only the amount of Joule loss generated from the coil of the motor and an iron loss generated in the stator core. It is also possible to further reduce the amount of heat by configuring an iron core of the motor using an amorphous and low-loss electromagnetic steel plate. Incidentally, the stator is easily manufactured if the housing 31 of the motor is made of the same material as the resin for molding the stator core and the coil and is integrally configured.

According to the present embodiment, the housing of the motor is made of the non-magnetic and non-conductive material such as resin, and thus, it is possible to eliminate the eddy current loss generated in the housing and to improve the heat dissipation property of the rotary electric machine.

Fourth Embodiment

Figure 10A:
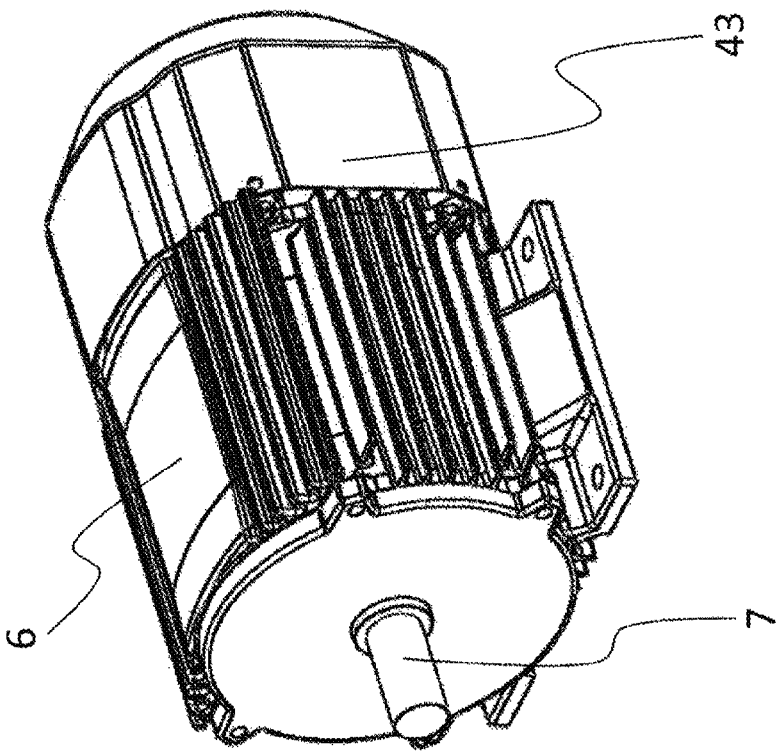
FIG. 10A is a perspective view of a motor on which an inverter is integrally mounted according to a fourth embodiment of the present invention.
Figure 10B:
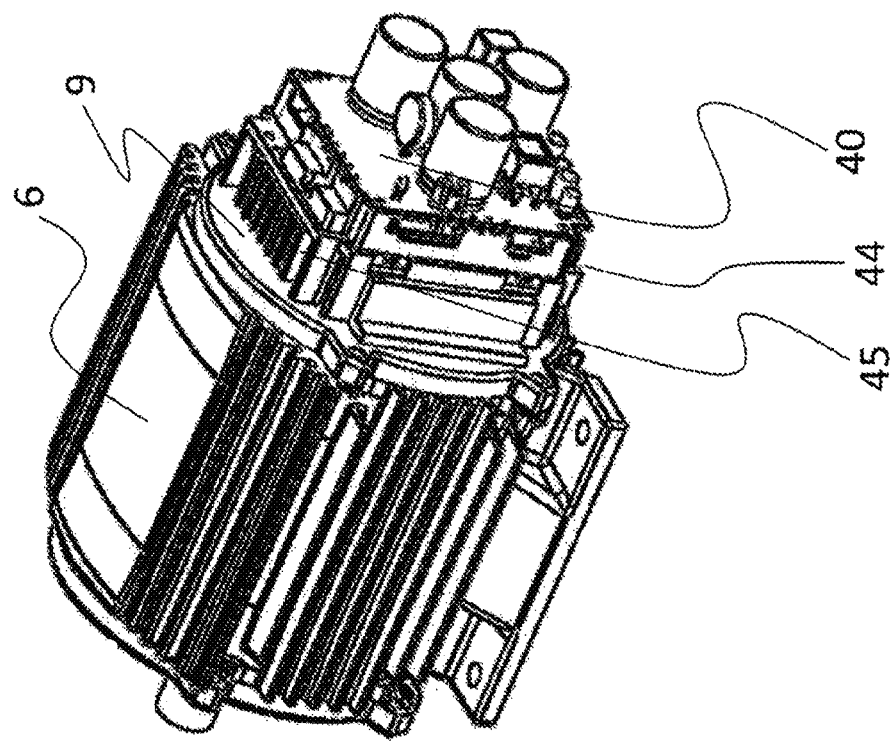
FIG. 10B is a perspective view for describing a structure of the motor on which the inverter is integrally mounted according to the fourth embodiment of the present invention.
Figure 10C:
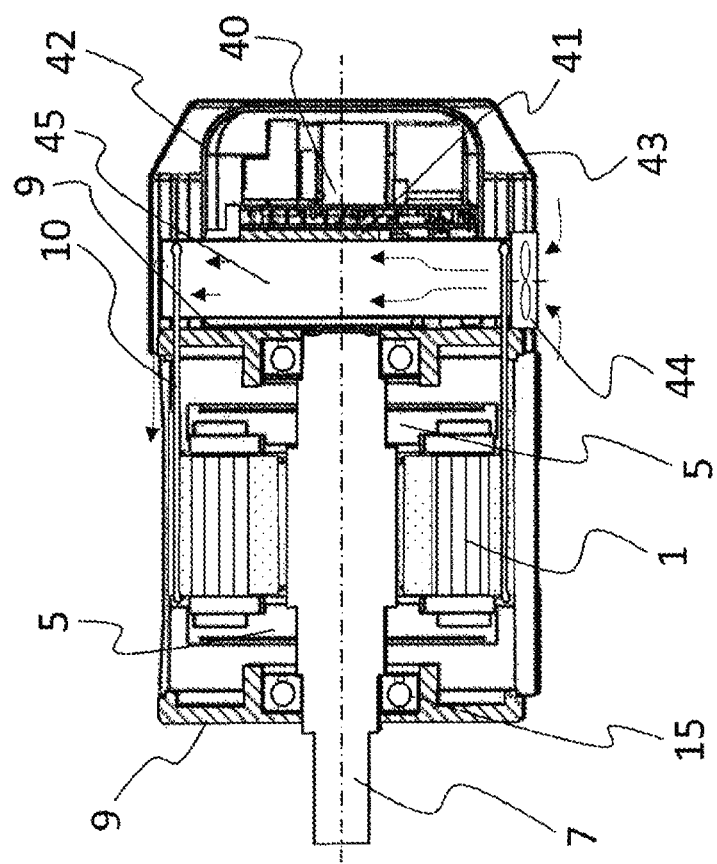
FIG. 10C is a cross-sectional view illustrating an arrangement of a cooling heat pipe of the motor on which the inverter is integrally mounted according to the fourth embodiment of the present invention.

FIGS. 10A to 10C illustrate configuration examples of a control device-integrated axial gap motor according to a fourth embodiment of the present invention. The axial gap motor of the present embodiment is a permanent magnet synchronous motor, and requires an inverter for control thereof. The permanent magnet synchronous motor is generally used by being connected, by a cable, with a general-purpose inverter as a separate body. The axial gap motor to be described in the present embodiment is characterized in that it is possible to obtain a large opposing area between a magnet and a stator core as described in FIG. 35, so that it is possible to obtain a large torque and a large output with a relatively thin size. Thus, since the motor section can be configured to be thin, it is possible to make the motor have almost the same size as a typical industrial motor even if the inverter, which is a control device to control the motor, is configured to be attached to, for example, an axial end portion.

FIG. 10A illustrates a configuration example in which the inverter is attached to the axial end portion. In the configuration, the inverter is mounted on the end portion of the axial gap motor, and an inverter cover 43 like a cover of the outer fan illustrated in FIG. 5A or the like, is attached to the inverter so that the appearance of the motor is a general industrial motor.

FIG. 9B illustrates an inverter mounting state in which the cover 43 is removed. In the configuration, a heat sink 45 configured to absorb heat of a power semiconductor is arranged at the end bracket 9 on the rear side of the motor, an axial flow fan 44 for cooling the inverter is arranged so that wind flows in a direction of a groove of the heat sink 45, that is, a direction in which the wind easily flows, thereby cooling the heat. In the configuration, an inverter control board 40 is mounted on an outer side in a direction of a rotation axis which is hardly affected by heat from a power element of the motor or the inverter.

FIG. 9C illustrates a cross-sectional view of the motor structure on which the inverter is mounted illustrated in FIG. 9B. An axial gap motor having two rotor structural body yokes 5 with the stator core 1 of the motor as the center in the axial direction is configured as a motor section. The heat pipe 10 of the present invention extends from an outer diameter side of the stator of the motor in the right direction of the paper plane while passing through the end bracket 9. In the configuration, the heat sink 45 is mounted on the end bracket 9, and the heat pipe 10 is in contact with the heat sink 45. The heat sink 10 is arranged so that the wind flows upward from the lower side by the axial flow fan 44 attached to the side thereof. In the configuration, a power element 41 such as an IGBT is attached to a surface of the heat sink 45 in close contact therewith, and heat generated from the power element 41 is easily transmitted to the heat sink 45. Further, the inverter control board 40 is configured on an outer portion of the power element 41, and the portion forming the inverter control board is covered with an inverter waterproof case 42. This is because the motor generally has a fully-closed structure so as to function well even in the case of being used in a place where rainwater intrudes, and needs to withstand the specification in the case of mounting the inverter thereon. As the entire inverter section covered with the inverter waterproof case 42 is covered with the inverter cover 43 like the cover of the outer fan, it is possible to realize the appearance and wind flow similar to those in the typical industrial motor. Note that, a flow direction of the wind of the axial flow fan may be a reverse direction. In the case of the typical industrial motor, wind is taken from a terminal end portion of the motor by a radial fan, flows to an outer circumference side, and is caused to flow to a surface of a housing as illustrated in FIG. 5B. However, there is also a case where there is an adverse effect if the wind after cooling the power element of the inverter as illustrated in FIG. 10C is caused to flow to the surface of the motor because the wind is warmed, and thus, it is necessary to adopt an aspect in which the wind having cooled the inverter is discharged directly from the axial flow fan.

In addition, it is desirable to adopt a waterproof structure for the axial flow fan 44 since the axial flow fan 44 is configured outside the inverter waterproof case 42. In addition, this motor is a laterally-placed motor, and it is desirable to provide a structure in which vapor evaporated in an evaporation portion rises and a liquid generated in a transpiration portion moves downward due to gravity in terms of the nature of the heat pipe. As described above, it is possible to expect the effect that the fine wires called wicks inside the heat pipe and inner folds thereof transfer the liquid to the low-density portion due to the capillary phenomenon, and thus, it is possible to expect an effect that the transpired liquid returns to a high-temperature portion and evaporates even with the lateral placement.

Figure 11:
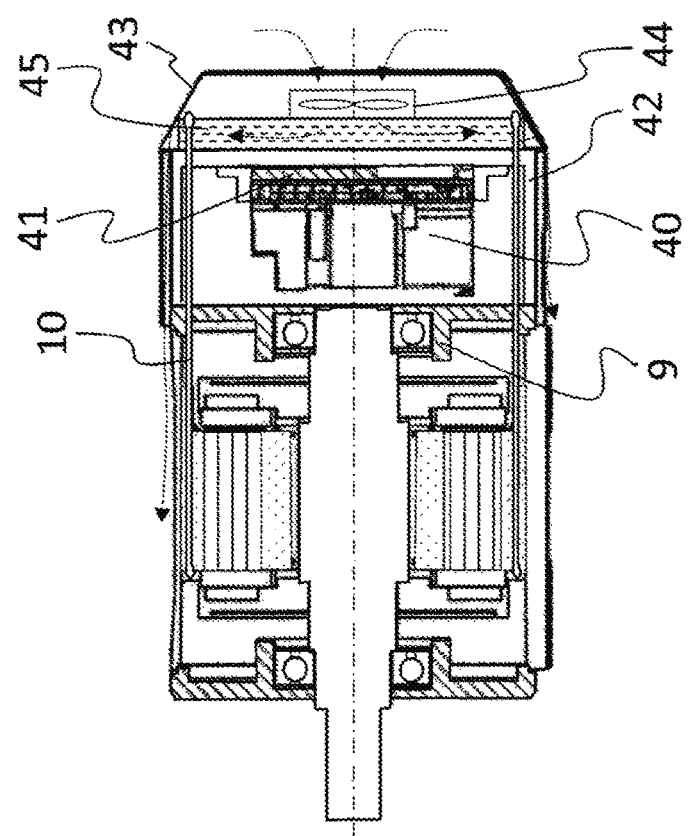
FIG. 11 is a cross-sectional view illustrating another example of the motor on which the inverter is integrally mounted according to the fourth embodiment of the present invention.

FIG. 11 illustrates another configuration of the axial gap motor on which the inverter is mounted. When the heat sink is arranged at the end bracket 9 of the motor, there is a risk that the heat of the power element of the inverter is transmitted to the motor and a rise in temperature of the motor section and a bearing is caused. Thus, this example provides a structure obtained by improving the risk. A waterproof inverter chamber is provided outside the end bracket 9 of the motor, and the power element 41 of the inverter is mounted to be directed toward a terminal end portion. In this structure, the heat sink 45 or a heat dissipating fin is arranged on the terminal end portion side, and a waterproof fan 44 is mounted on the outer side thereof and is covered with a fan cover 43. In this case, the heat pipe 10 of the present embodiment is configured to extend up to the heat sink 45 at a re-terminal end portion and to be in contact with the heat sink 45. The direction of wind of the outer fan 44 may be arbitrarily set, but is desirably determined depending on the temperature of the power element as described above.

According to the present embodiment, it is possible to provide the motor which has almost the same size as the typical industrial motor and is easy to use in terms of portability or the like by integrally attaching the control device such as the inverter to the axial end portion of the axial gap motor.

Fifth Embodiment

Figure 12:
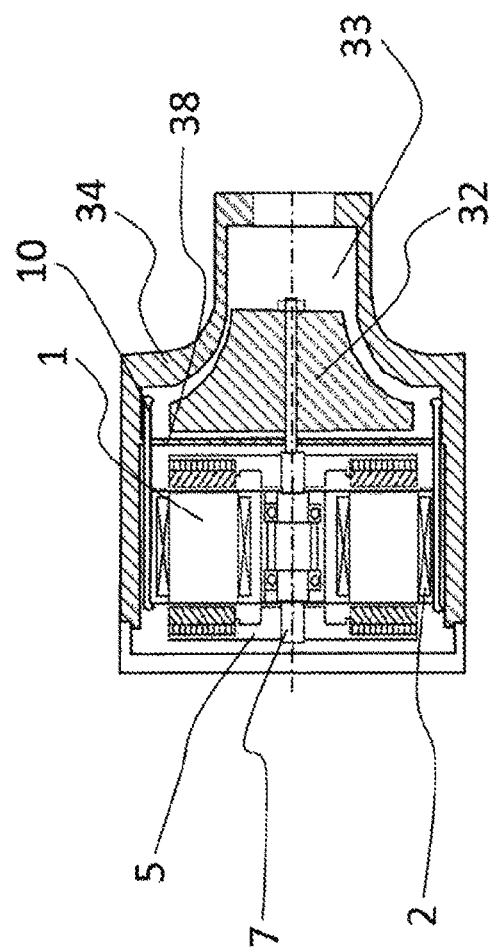
FIG. 12 is a cross-sectional view illustrating an arrangement of a cooling heat pipe of a pump-integrated motor according to a fifth embodiment of the present invention.

FIG. 12 illustrates an axial gap motor in which a mechanical component is integrally mounted on a motor according to a fifth embodiment of the present invention. FIG. 12 illustrates an example in which a pump is integrated. Since a motor size is thin in the axial gap motor, there is an advantage that the integration with the mechanical component can be made compact. In FIG. 12, the rotating shaft 7 is connected to an impeller 32 of the pump via a pump chamber 33 into which water enters at an axial end of the motor and a partition wall 38 configured to isolate a motor section. Incidentally, a reference numeral 34 denotes a pump case. The heat pipe 10 of the present embodiment is mounted to pass through the partition wall 38 and extend to the pump chamber 33 containing water. As a result, it is possible to transfer heat from the motor section to water with to an evaporation portion of the heat pipe 10 as the motor section and a condensation portion as the pump chamber. In this case, it is unnecessary to provide a member such as a heat dissipating fin depending on cooling performance of water. Incidentally, the pump-integrated motor is described in the drawing, but the motor can be integrated with another mechanical component that is driven by the motor without being limited to the pump.

According to the present embodiment, the pump is integrally configured in the axial end portion of the axial gap motor, and the heat pipe provided in the stator is extended to the pump chamber, so that it is possible to significantly improve the heat dissipation property of the axial gap motor without increasing the device size.

REFERENCE SIGNS LIST 1 stator core (iron core)
2 stator coil (winding)
3 permanent magnet
4 rotor yoke portion
5 rotor structure yoke
6 housing
7 rotating shaft
8 stator-molded resin portion
9 end bracket
10 heat pipe
11 radial-type rotary electric machine stator core
12 radial-type rotary electric machine stator coil
13 radial-type rotary electric machine permanent magnet
15 bearing
21 outer fan
22 fan cover
23 cooling fin
26 heat-dissipating plate
27 insulating bobbin
31 resin-molded housing
32 impeller
33 pump chamber
34 pump case
38 partition wall
40 inverter control board
41 power element
42 inverter case
43 inverter cover
44 axial flow fan
45 heat sink
100 stator
200, 300 rotor

The invention claimed is:

1. An axial gap rotary electric machine comprising a stator and a rotor in an axial direction, wherein
   the stator has a plurality of stator cores arranged in a circumferential direction and coils wound around the stator cores, and
   a heat pipe obtained by filling an inside of a metal hollow pipe with a refrigerant is arranged in a gap between adjacent coils formed in an outer diameter portion of the stator in a radial direction and a housing with a necessary insulation distance between the coils and the heat pipe.

2. The axial gap rotary electric machine according to claim 1, wherein
   the heat pipe extends in a direction of a rotation axis and an opposite output side and is in contact with and fixed to an end bracket on the opposite output side.

3. The axial gap rotary electric machine according to claim 1, wherein
   the heat pipe extends in a direction of a rotation axis and an opposite output side and is in contact with a heat dissipating fin outside an end bracket on the opposite output side.

4. The axial gap rotary electric machine according to claim 3, wherein
   the heat dissipating fin has a disc shape and has a hole into which the heat pipe is fitted opened in the circumferential direction, and
   the heat pipe is in contact with and fixed to the hole.

5. The axial gap rotary electric machine according to claim 4, wherein
   the disc-shaped heat dissipating fin has a flat plate structure in which a metal plate is punched into a disc shape.

6. The axial gap rotary electric machine according to claim 4, wherein
   the disc-shaped heat dissipating fin has a spiral structure in which a thin metal plate is edgewisely wound into a disc shape.

7. The axial gap rotary electric machine according to claim 4, wherein the disc-shaped heat dissipating fin has a structure in which strip-shaped metal plates are joined together.

8. The axial gap rotary electric machine according to claim 4, wherein
the disc-shaped heat dissipating fin is configured using a metal block, and irregularities for increasing a surface area are formed on a surface thereof.

9. The axial gap rotary electric machine according to claim 1, wherein
one stator and two rotors on both sides of the stator are provided in the axial direction, and
at least the stator core, the coil, and the heat pipe are molded with a molding resin.

10. The axial gap rotary electric machine according to claim 1, wherein
the heat pipe is arranged only between adjacent coils having an identical phase and different current directions.

11. The axial gap rotary electric machine according to claim 1, wherein
the heat pipe is in contact with and fixed to a heat dissipating plate which is arranged at an end portion of a resin bobbin of the stator core and has a grounding function.

12. The axial gap rotary electric machine according to claim 1, wherein
the housing is made of a non-magnetic and non-conductive material, and
at least the housing, the stator core, the coil, and the heat pipe are molded with a molding resin.

13. The axial gap rotary electric machine according to claim 1, wherein
a heat sink for cooling a power element of a rotary electric machine control device is arranged at the end bracket on the opposite output side,
a control board of the rotary electric machine control device is further arranged on an outer portion of the heat sink, and
the heat pipe is in contact with and fixed to the heat sink.

14. The axial gap rotary electric machine according to claim 1, wherein
a control board of a rotary electric machine control device is arranged at the end bracket on the opposite output side,
a heat sink for cooling a power element of the rotary electric machine control device is further arranged on an outer portion of the heat sink, and
the heat pipe is in contact with and fixed to the heat sink.

15. The axial gap rotary electric machine according to claim 1, wherein
a pump is integrally attached to an output shaft side of the rotary electric machine, and
the heat pipe is extended to a pump chamber of the pump.

* * * * *